(12) United States Patent
Vidmar et al.

(10) Patent No.: US 8,220,099 B2
(45) Date of Patent: Jul. 17, 2012

(54) LINT PATCH—PORTABLE DISPOSABLE LINT AND PARTICLE REMOVERS

(76) Inventors: John Michael Vidmar, Columbus, OH (US); Michael Edward Braatz, Dublin, OH (US)

( * ) Notice: Subject to any disclaimer, the term of this patent is extended or adjusted under 35 U.S.C. 154(b) by 727 days.

(21) Appl. No.: 12/070,494

(22) Filed: Feb. 19, 2008

(65) Prior Publication Data

US 2008/0196186 A1    Aug. 21, 2008

Related U.S. Application Data

(60) Provisional application No. 60/890,560, filed on Feb. 19, 2007.

(51) Int. Cl.
*A47L 25/00* (2006.01)
(52) U.S. Cl. .................. 15/104.002; 15/209.1
(58) Field of Classification Search ............. 15/104.002, 15/227, 209.1
See application file for complete search history.

(56) References Cited

U.S. PATENT DOCUMENTS

| | | | |
|---|---|---|---|
| 3,299,461 A * | 1/1967 | Marks | 15/104.002 |
| 3,583,358 A * | 6/1971 | Hanson, Jr. | 116/235 |
| 4,820,558 A | 4/1989 | Sundberg | |
| 4,907,825 A * | 3/1990 | Miles et al. | 281/51 |
| 5,027,465 A * | 7/1991 | McKay | 15/104.002 |
| 5,695,219 A * | 12/1997 | Crawford | 283/39 |
| 5,894,623 A | 4/1999 | Thill | |
| 6,024,970 A | 2/2000 | Woodward | |
| 6,787,679 B1 * | 9/2004 | Cantor | 602/41 |
| 6,954,963 B2 | 10/2005 | McKay | |
| 7,107,643 B1 | 9/2006 | McKay | |
| 2002/0124335 A1 | 9/2002 | Franko, Sr. | |
| 2007/0136966 A1 * | 6/2007 | Aubourg et al. | 15/104.002 |

* cited by examiner

*Primary Examiner* — Shay Karls
(74) *Attorney, Agent, or Firm* — Benjamen E. Kern

(57) ABSTRACT

A lint removal apparatus containing a tabbed end or ends on any side so a user to grip and hold the apparatus. One side of the apparatus contains an adhesive side that is protected by a backing. The backing must be removed by the user prior to using the apparatus. Once the backing is removed, a small portion of the backing will remain so that user can easily grip the apparatus. While gripping the apparatus, the user may remove lint by pressing the exposed adhesive side of the apparatus against the desired area containing lint or other particles to be removed. The apparatus is a small, durable, portable, economic, practical and be used by all individuals regardless of physical size.

9 Claims, 5 Drawing Sheets

LINT PATCH—PORTABLE DISPOSABLE LINT AND PARTICLE REMOVERS

CROSS REFERENCE TO RELATED APPLICATIONS

This application claims the benefit of provisional patent application Ser. No. 60/890,560, filed 2007 Feb. 19 by the present inventors.

FEDERALLY SPONSORED RESEARCH

Not Applicable.

SEQUENCE LISTING OR PROGRAM

Not Applicable.

BACKGROUND OF THE INVENTION

1. Field of Invention

The present application relates generally to a device for removing lint and other debris from clothing and the like. In particular, the application relates to a handheld disposable sheet, or patch, for removing lint and other debris from clothing and the like.

2. Prior Art

Clothing and other fabric covered articles, such as chairs, couches, and the like, have a tendency to collect or attract lint. As used herein, the term "lint" refers to fibers from both natural and/or synthetic sources, including hair from any animal, and any natural and/or synthetic particles and/or particulate matter, and the like, as well as dust, other debris, and the like.

Lint is considered an undesirable item when attached to clothing or other fabric covered articles. Due to its undesirable nature individuals are in need of easy and inexpensive methods of removing lint from clothing and other fabric covered articles. The knowledge of lint's undesirable nature has caused inventors to seek several ways to remove lint once it has become attached to clothing and other fabric covered items.

Inventors have done a commendable job of inventing several methods through which lint may be removed from clothing and other fabric covered items. However, the known prior art devices for removing lint include lint rollers, lint mitts, lint brushes and other bulky or cumbersome devices can not meet the needs of all individuals.

The lint roller with a tab, U.S. Pat. No. 6,954,953 to McKay and the lint brush U.S. Pat. No. 7,107,634 to McKay and all other similar lint removal devices are large and bulky devices taking up relatively large amounts of space. The amount of space discourages individuals from carrying this product with them. The failure to easily carry these items is a detriment to individuals who wish to have a lint removal device on their person at all times.

The lint mitt, U.S. Pub. No. 2002/0124335 μl to Franko, Sr. and LINT GLOVE, U.S. Pat. No. 6,024,970 to Woodward are more compact lint removal devices than the aforementioned lint roller and lint brush, but are not without their drawbacks. These devices both require a user to insert their hand or a portion thereof to effectively utilize the device. The requirement that a user insert their hand into the device both increases production costs and the likelihood the product will tear or otherwise become unusable through common use.

The DISPOSABLE LINT REMOVER disclosed in U.S. Pat. No. 5,894,623 describes a device that is less bulky and more portable than the preceding devices. Although less bulky and more portable, the DISPOSABLE LINT REMOVER requires the user to insert two fingers into thin tabs which will allow the user to grasp the apparatus. This design suffers from many of the same downfalls of the LINT GLOVE and lint mitt in that it requires a component that must be made of thin material yet must survive the handling by fingers of various sizes and strengths.

There are several types of lint removal apparatuses available for review, but all the known available apparatuses suffer from a number of disadvantages. These disadvantages either make the apparatus costly to produce, difficult to transport or subject to undue breakage.

BRIEF SUMMARY

This invention seeks to distinguish itself from the prior art by providing several advantages over the prior art while accomplishing several objectives. This invention is an invention that will provide useful benefits above and beyond those currently available.

This major advantage of this invention is that the device is readily portable. This invention is capable of easily being placed into a shirt pocket, pants pockets or likewise taking up little space in a briefcase, purse or other similar device. The product is also capable of being placed into a wallet for easy transport. Due to its size users will also be able to easily carry more than one Lint Patch with them at any given time. While retaining this portability and compact feature, the invention still provides a small tab that can serve as a handle during its use.

The next significant advantage of the invention is its durability. Although a disposable product durability is important for the transport and use of the invention. The invention has no additional components, compartments, accessories, attachments or gripping devices that could easily be damaged and render the invention unusable. The invention's durability will allow it to ready and available for use under almost all circumstances.

Another advantage to the invention is that it can be used by individuals without regard to hand size or strength. This invention, unlike the aforementioned lint glove or lint mitt inventions, does not have limitations that can be attributed to the end users personal characteristics. A small hand or a large hand will be equally capable of using this invention without causing any damage to the product as may occur with the use of the lint glove or the lint mitt. These limitations are removed because instead of utilizing compartments or tabs for the user to grip, the adhesive side of the invention will retain a non-adhesive portion whereby the invention may be held during its use.

Further possible advantages to the invention are that the backing used to protect the adhesive before use may be saved and reapplied to the invention. This reapplication of the backing can allow for the invention to be used more than once by an end user. The invention will also be inexpensive to produce as it does not require any special attachments or gripping devices in order for the invention to be used. The invention can also be made to have customized imprinting on it to provide for additional sales and marketing opportunities.

In conclusion the invention provides for a durable, economical, easily portable and easy to use apparatus with a tabbed gripping area which an individual may utilize to remove lint from clothing or other fabric covered articles.

BRIEF DESCRIPTION OF THE DRAWINGS

It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as one element. Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
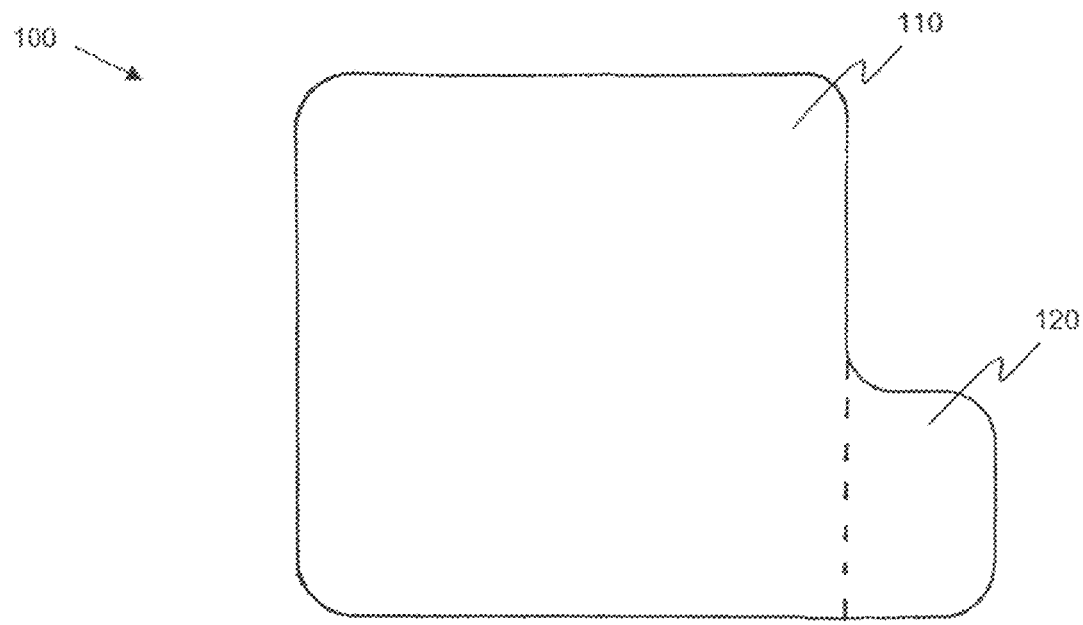
FIG. 1 is a front planar view of one embodiment of a lint patch having a tab.

FIG. 1 shows a front planar view of one embodiment of a lint patch 100. In the illustrated embodiment, the lint patch 100 includes a sheet 110 and a tab 120. The sheet 110 is generally square with rounded corners. In an alternative embodiment (not shown), the sheet may have sharp corners. In other alternative embodiments (not shown), the sheet may be rectangular, circular, oval, or have the shape of any regular or irregular polygon.

The tab 120 is configured to be grasped by a user's thumb and/or fingers. In the illustrated embodiment, the tab 120 is located at the bottom right corner of the sheet 110 and extends approximately ⅓ the length of the sheet 110. In alternative embodiments (not shown), the tab 120 may have a length that is approximately 5% of the length of the sheet to approximately 150% of the length of the sheet. In an alternative embodiment (not shown), a loop or a ring of material may be used in place of a tab.

Figure 2:
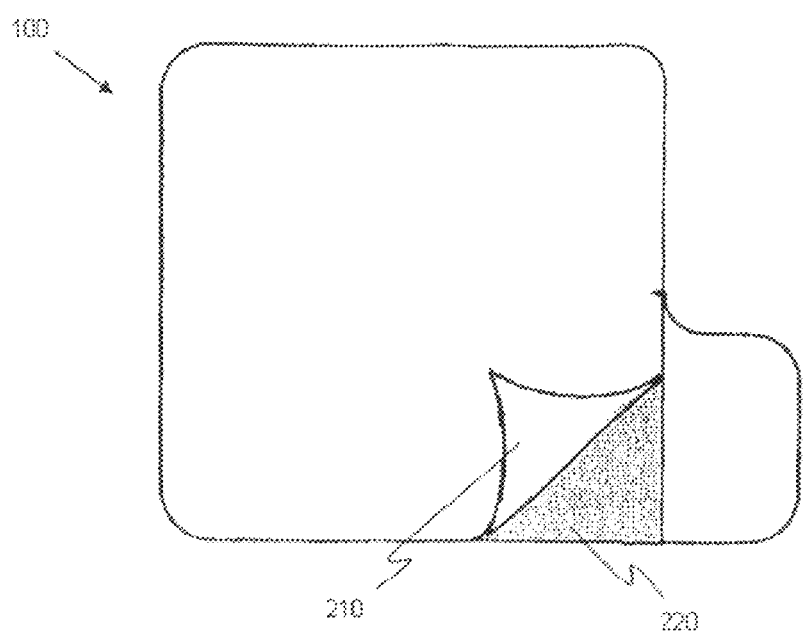
FIG. 2 is a front planar view of one embodiment of a lint patch with a backing partially removed.

FIG. 2 illustrates a front planar view of the lint patch 100, having a backing 210 partially removed to expose an adhesive surface 220. The backing 210 includes a non-stick surface, allowing it to be peeled from the adhesive surface 220. In the illustrated embodiment, the adhesive surface 220 and the backing 210 extend across the entire sheet 110, but neither the adhesive surface 220 nor the backing 210 extend to the tab 120. In an alternative embodiment (not shown), only a portion of the sheet (i.e., less than 100%) is covered by the adhesive surface 220 and the backing 210. For example, a border may extend around the edges of the sheet 110 to allow a user to handle the edges of the lint patch 100. In another alternative embodiment (not shown), the adhesive surface 220 and the backing 210 extend across the tab 120.

In one embodiment (not shown), the adhesive surface is scented, so that the lint patch 100 may serve dual functions of removing lint and providing a pleasing scent to clothing, furniture, and other objects.

Figure 3:
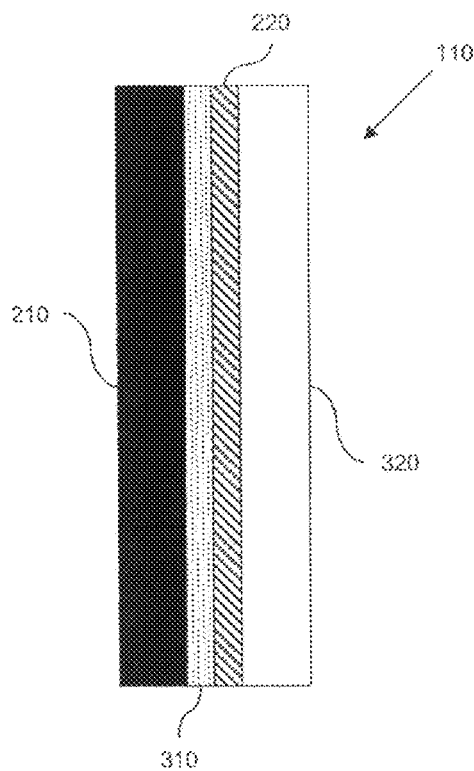
FIG. 3 is a simplified close-up side view of one embodiment of a lint patch.

FIG. 3 illustrates a cross-section of one embodiment of the sheet 110. In one embodiment, the sheet 110 has a thickness of about 0.01 inches to about 0.1 inches. In an alternative embodiment, the sheet 110 has a thickness of about 0.002 inches to about 0.5 inches. In the illustrated embodiment, the sheet 110 includes the backing 210 having a release coating 310 provided thereon. The backing 210 may be constructed of paper, cardboard, or other similar material. In an alternative embodiment (not shown), the release coating 310 is impregnated into the backing 310 to form an overall "release backing" having a unitary construction.

With continued reference to FIG. 3, the sheet 110 further includes a face sheet 320 having an adhesive provided thereon to form the adhesive surface 220. In one embodiment, the adhesive may be a full-coat pressure-sensitive face.

As is known to those skilled in the art, release coating 310 functions to allow removal or "peel off" of backing 210 from the sheet 110, for exposure of the adhesive surface 220 as desired. Adhesive laminate is commercially available in roll form from, for example, Green Bay Packaging Inc.—Coated Products Operations of Green Bay, Wis., and from Avery Dennison Corporation of Pasadena, Calif.

Figure 4:
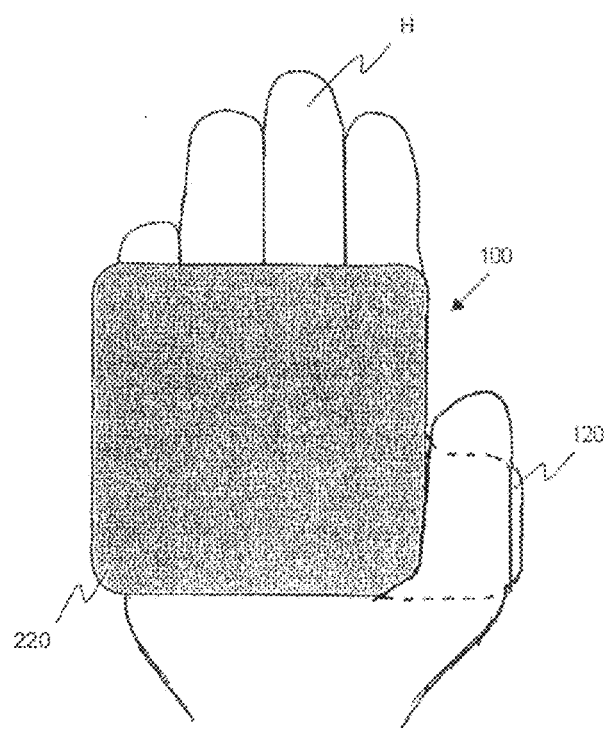
FIG. 4 is a front view of one embodiment of a lint patch, held by an exemplary user.

FIG. 4 illustrates one embodiment of a lint patch 100 in use by an exemplary user. In the illustrated embodiment, the user holds the lint patch 100 with his right hand H. The tab 120 extends beneath the thumb of the user's hand H. The user may grasp the tab 120 by squeezing it between the thumb and the forefinger of the right hand H. It should be understood that the lint patch 100 may be rotated 180 degrees, such that the tab 120 extends from the upper left corner of the sheet 110 instead of the lower right corner. In this orientation, the lint patch 100 may be grasped by the left hand of the user, with the tab extending behind the thumb of the user's left hand.

In the illustrated embodiment, the user has removed the backing from the sheet 110 to expose the adhesive surface 220. The user may then remove lint, hair, dirt, or other loose material from an article of clothing, furniture, or other objects, by pressing the adhesive surface 220 of the sheet 110 against the object, then lifting the lint patch 100. The user may use a brushing or a patting motion to achieve lint removal.

In one embodiment, before the backing 210 is removed from the lint patch 100, the lint patch 100 may be easily transported in a user's pocket, purse, briefcase, or other such location. Alternatively, the lint patch 100 may be stored in a closet, drawer, chest, trunk, shelf, or other such location. For example, in one embodiment, a plurality of lint patches may be joined together in a continuous tape, with the boundaries of each lint patch defined by perforations. In this embodiment, the continuous tape may be wound in a roll for storage. The roll may be stored in a dispenser.

In an alternative embodiment, a plurality of lint patches may be stacked on top of each other, or next to each other, for bulk storage or transportation. The stack of lint patches may be stored in a dispenser. In one embodiment, the lint patches may have tabs different locations to facilitate the removal of a single lint patch from the sheet.

Figure 5:
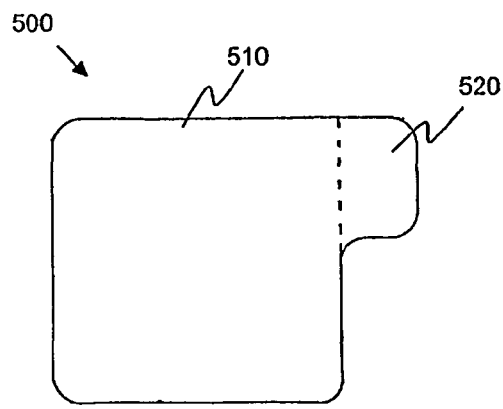
FIG. 5 is a front planar view of an alternative embodiment of a lint patch having a tab on an upper right corner.

For example, FIG. 5 illustrates an alternative embodiment of a lint patch 500 having a sheet 510 and a tab 520 extending from the upper right corner of the sheet. It should be understood that the lint patch 500 otherwise has the same features as those described above in relation to the lint patch 100 illustrated in FIGS. 1-4.

Figure 6:
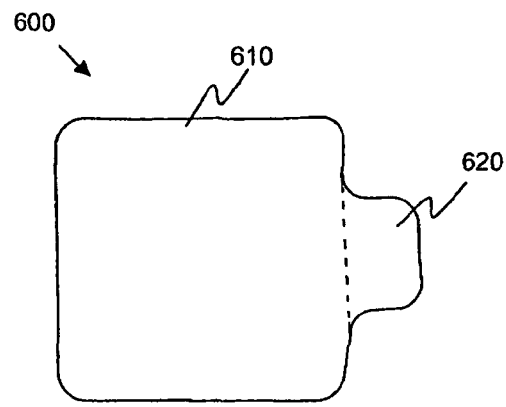
FIG. 6 is a front planar view of an alternative embodiment of a lint patch having a tab on a right side.

FIG. 6 illustrates another alternative embodiment of a lint patch 600. In this embodiment, the lint patch 600 has a sheet 610 and a tab 620 extending from a central portion of the right side of the sheet. It should be understood that the lint patch 600 otherwise has the same properties as those described above in relation to the lint patch 100 illustrated in FIGS. 1-4.

In one embodiment, to facilitate easy removal of a single lint patch, a stack of lint patches may alternate between a lint patch 100 having a tab 120 extending from a lower right corner of the sheet 110, followed by a lint patch 600 having a tab 620 extending from a central portion of the right side of the sheet 610, followed by a lint patch 500 having a tab 520 extending from the upper right corner of the sheet 510. It should be understood, however, that the lint patches may be stacked in any desired order.

Figure 7:
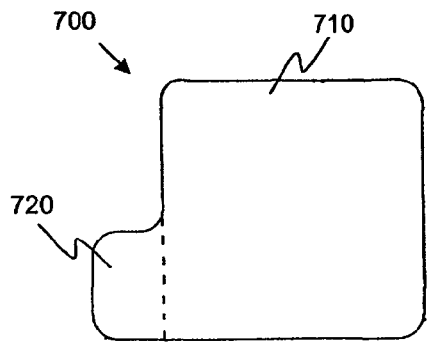
FIG. 7 is a front planar view of an alternative embodiment of a lint patch having a tab on a lower left corner.
Figure 8:
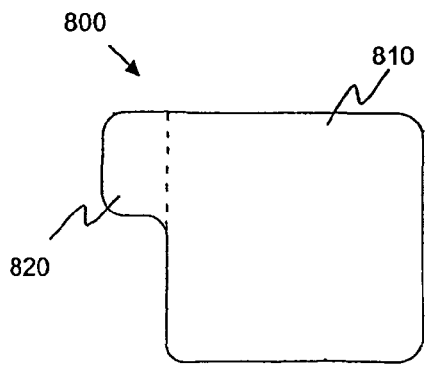
FIG. 8 is a front planar view of an alternative embodiment of a lint patch having a tab on an upper left corner.
Figure 9:
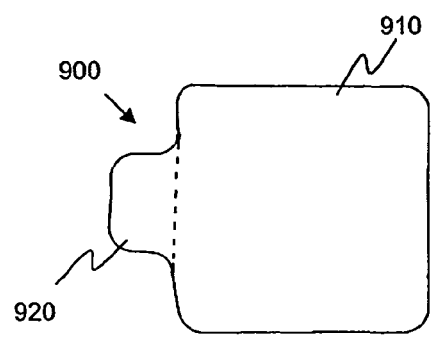
FIG. 9 is a front planar view of an alternative embodiment of a lint patch having a tab on a left side.

FIGS. 7-9 illustrate additional alternative embodiments of lint patches configured to be grasped by a user's left hand (not shown). FIG. 7 illustrates an alternative embodiment of a lint patch 700 having a sheet 710 and a tab 720 extending from a lower left corner of the sheet 710. It should be understood that the lint patch 700 otherwise has the same properties as those described above in relation to the lint patch 100 illustrated in FIGS. 1-4. It should be further understood that the lint patch 700 may be structurally identical to the lint patch 500 illustrated in FIG. 5, but rotated 180 degrees.

FIG. 8 illustrates an alternative embodiment of a lint patch 800 having a sheet 810 and a tab 820 extending from an upper left corner of the sheet 810. It should be understood that the lint patch 800 otherwise has the same properties as those described above in relation to the lint patch 100 illustrated in FIGS. 1-4. It should be further understood that the lint patch 800 may be structurally identical to the lint patch 100, but rotated 180 degrees.

FIG. 9 illustrates an alternative embodiment of a lint patch 900 having a sheet 910 and a tab 920 extending from a central portion of the left side of the sheet 910. It should be understood that the lint patch 900 otherwise has the same properties as those described above in relation to the lint patch 100 illustrated in FIGS. 1-4. It should be further understood that the lint patch 900 may be structurally identical to the lint patch 600 illustrated in FIG. 6, but rotated 180 degrees.

Figure 10:
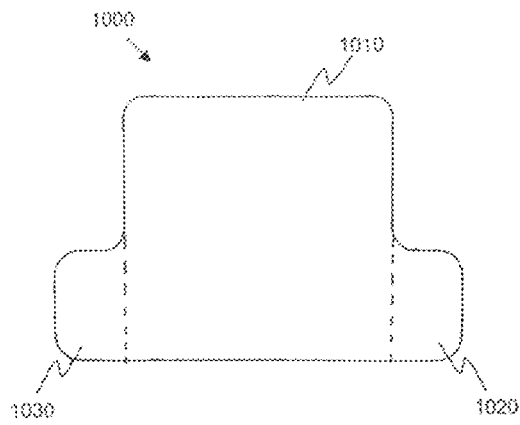
FIG. 10 is a front planar view of an alternative embodiment of a lint patch having a pair of tabs on a lower right corner and a lower left corner.

FIG. 10 illustrates an alternative embodiment of a lint patch 1000 configured to be grasped by a user's right or left hand without the need to rotate the lint patch 1000. In the illustrated embodiment, the lint patch 1000 includes a sheet 1010, a first tab 1020 extending from the lower right corner of the sheet 1010, and a second tab 1030 extending from the lower left corner of the sheet 1010. The sheet 1010 is generally square with rounded corners. In an alternative embodiment (not shown), the sheet may have sharp corners. In other alternative embodiments (not shown), the sheet may be rectangular, circular, oval, or have the shape of any regular or irregular polygon.

The tab 1020 is configured to be grasped by a user's right thumb and/or fingers when the lint patch 1010 is held by a right hand. When the lint patch 1010 is held by a user's left hand, the tab 1020 may be grasped between a user's left pinky finger and left ring finger, or it may simply be left free. In the illustrated embodiment, the tab 1020 is located at the bottom right corner of the sheet 1010 and extends approximately ⅓ the length of the sheet 1010. In alternative embodiments (not shown), the tab 1020 may have a length that is approximately 5% of the length of the sheet to approximately 150% of the length of the sheet. In an alternative embodiment (not shown), a loop or a ring of material may be used in place of a tab.

The tab 1030 is configured to be grasped by a user's left thumb and/or fingers when the lint patch 1010 is held by a left hand. When the lint patch 1010 is held by a user's right hand, the tab 1030 may be grasped between a user's right pinky finger and right ring finger, or it may simply be left free. In the illustrated embodiment, the tab 1030 is located at the bottom left corner of the sheet 1010 and extends approximately ⅓ the length of the sheet 1010. In alternative embodiments (not shown), the tab 1030 may have a length that is approximately 5% of the length of the sheet to approximately 150% of the length of the sheet. In an alternative embodiment (not shown), a loop or a ring of material may be used in place of a tab.

Figure 11:
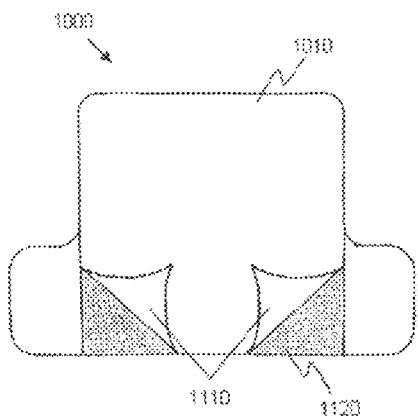
FIG. 11 is a front planar view of an alternative embodiment of a lint patch having a pair of tabs, with a backing partially removed.

FIG. 11 illustrates a front planar view of the lint patch 1000, having a backing 1110 partially removed to expose an adhesive surface 1120. The backing 1110 includes a non-stick surface, allowing it to be peeled from the adhesive surface 1120. In the illustrated embodiment, the adhesive surface 1120 and the backing 1110 extend across the entire sheet 1010, but neither the adhesive surface 1120 nor the backing 1110 extend to the tabs 1020, 1030. In an alternative embodiment (not shown), only a portion of the sheet is covered by the adhesive surface 1120 and the backing 1110. For example, a border may extend around the edges of the sheet 1010 to allow a user to handle the edges of the lint patch 1000. In another alternative embodiment (not shown), the adhesive surface 1120 and the backing 1110 extend across the tabs 1020, 1030.

Figure 12:
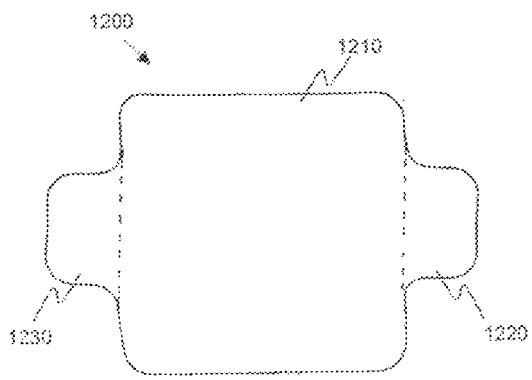
FIG. 12 is a front planar view of an alternative embodiment of a lint patch having a pair of tabs on a right side and a left side.

FIG. 12 illustrates another alternative embodiment of a lint patch 1200. In this embodiment, the lint patch 1200 has a sheet 1210, a first tab 1220 extending from a central portion of the right side of the sheet 1210, and a second tab 1230 extending from a central portion of the left side of the sheet 1210. It should be understood that the lint patch 1200 otherwise has the same properties as those described above in relation to the lint patch 1000 illustrated in FIGS. 10-11.

Figure 13:
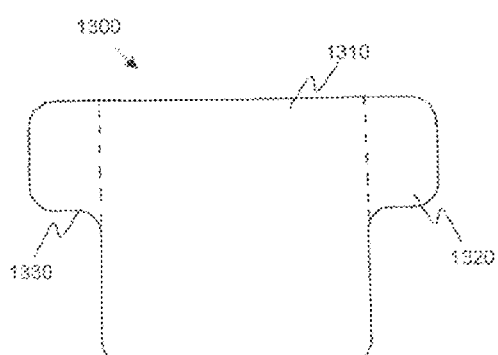
FIG. 13 is a front planar view of an alternative embodiment of a lint patch having a pair of tabs on an upper right corner and an upper left corner.

FIG. 13 illustrates another alternative embodiment of a lint patch 1300 having a sheet 1310, a first tab 1320 extending from the upper right corner of the sheet 1310, and a second tab 1330 extending from the upper left corner of the sheet 1310. It should be understood that the lint patch 1300 otherwise has the same properties as those described above in relation to the lint patch 1000 illustrated in FIGS. 10-11. It should be further understood that the lint patch 1300 may be structurally identical to the lint patch 1000, but rotated 180 degrees.

Figure 14:
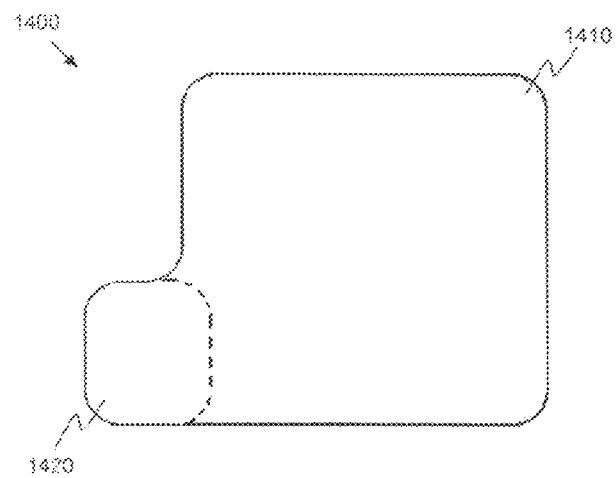
FIG. 14 is a front planar view of an alternative embodiment of a lint patch having a curved perforation.

FIG. 14 illustrates another alternative embodiment of a lint patch 1400 having sheet 1410 and a curved perforation defining a tab 1420. In prior illustrated embodiments, the lint patches were shown to have tabs defined by a straight perforation. It should be understood that the tab may take any desired shape.

Figure 15:
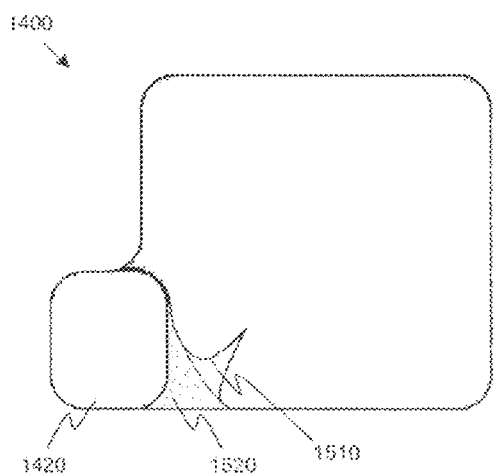
FIG. 15 is a front planar view of an alternative embodiment of a lint patch having a curved perforation, with a backing partially removed.

FIG. 15 illustrates a front planar view of the lint patch 1400, having a backing 1510 partially removed to expose an adhesive surface 1520. The backing 1510 includes a non-stick surface, allowing it to be peeled from the adhesive surface 1520. In the illustrated embodiment, the adhesive surface 1520 and the backing 1510 extend across the entire sheet 110, but neither the adhesive surface 1520 nor the backing 1510 extend to the tab 1520. In an alternative embodiment (not shown), only a portion of the sheet is covered by the adhesive surface 1520 and the backing 1510. For example, a border may extend around the edges of the sheet 1410 to allow a user to handle the edges of the lint patch 1400.

Figure 16:
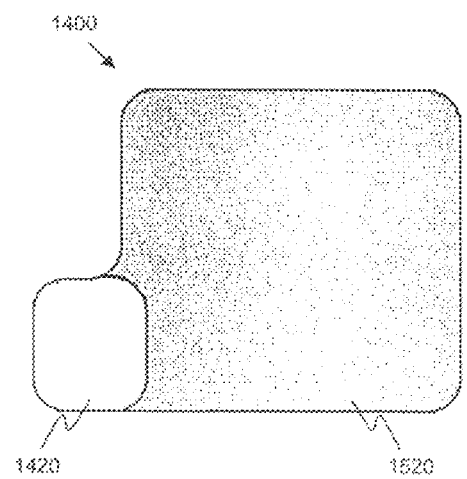
FIG. 16 is a front planar view of an alternative embodiment of a lint patch having a curved perforation, with a backing removed.

FIG. 16 illustrates a front planar view of the lint patch 1400, with the backing completely removed to expose the adhesive surface 1520. In the illustrated embodiment, the tab 1420 has a rectangular shape, with rounded corners. In one embodiment, the tab is shaped to provide a non-stick surface for a user to grasp, while maximizing the size of the adhesive surface 1520.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A disposable lint removal patch for removing lint from clothing, furniture, and other articles, the lint removal patch comprising:
    an adhesive laminate comprising a face sheet having an adhesive surface disposed thereon and a backing having a release coat thereon, wherein the backing is disposed on the adhesive surface of the face sheet;
    a first non-adhesive tab and a second non-adhesive tab integrally connected to and extending from the face sheet, configured to be grasped by a user's thumb and finger during use of the disposable lint removal patch to collect lint;
    wherein the backing is configured to be removed from the adhesive laminate to expose the adhesive surface, thereby permitting the adhesive surface to collect lint thereon when the adhesive surface is pressed against an article; and
    wherein the adhesive surface and the backing do not extend to the first non-adhesive tab and the second non-adhesive tab.

2. The disposable lint removal patch of claim 1, wherein the adhesive surface is disposed on a portion of the face sheet that is less than 100% of a surface area of the face sheet.

3. The disposable lint removal patch of claim 1, wherein the adhesive surface comprises a scented adhesive.

4. The disposable lint removal patch of claim 1, wherein al least one of the first non-adhesive tab and second non-adhesive tab is a substantially rectangular, square, or circular area configured not to expose adhesive to a user.

5. The disposable lint removal patch of claim 1, wherein the patch is joined with at least one other patch in a continuous tape, and wherein the patches comprise boundaries defined by perforations.

6. The disposable lint removal patch of claim 1, wherein the patch is contiguous to at least one other patch in a stack, wherein each patch comprises a first and second non adhesive tab integrally connected to and extending from the face sheet at a point that is different from that point from which the first and second non-adhesive tab extends from the contiguous patch.

7. A disposable hand held cleaning patch for removing lint and other particles from clothing and other fabric covered articles, the patch comprising:
    a thin and flexible material comprising an adhesive lint removal side, a non-adhesive side, and a first non-adhesive tabbed portion and a second non-adhesive tabbed portion integrally connected to the thin and flexible material;
    wherein the first non-adhesive tabbed portion and second non-adhesive tabbed portion is configured to be grasped by a user during use or the patch to collect lint;
    a backing disposed on the adhesive lint removal side of the thin and flexible material; and
    wherein the adhesive lint removal side and the backing do not extend to the first non-adhesive tabbed portion and second non-adhesive tabbed portion.

8. The disposable hand held cleaning patch of claim 7, wherein the patch is joined with at least one other patch in a continuous tape, and wherein the patches comprise boundaries defined by perforations.

9. The disposable hand held cleaning patch of claim 7, wherein the patch is contiguous to at least one other patch in a stack, wherein each patch comprises a first and second non-adhesive tabbed portion integrally connected to the thin and flexible material at a point that is different from that point from which the first and second non-adhesive tabbed portion integrally connects to the contagious patch.

* * * * *